(12) United States Patent
Kobayashi et al.

(10) Patent No.: US 7,619,965 B2
(45) Date of Patent: Nov. 17, 2009

(54) STORAGE NETWORK MANAGEMENT SERVER, STORAGE NETWORK MANAGING METHOD, STORAGE NETWORK MANAGING PROGRAM, AND STORAGE NETWORK MANAGEMENT SYSTEM

(75) Inventors: Emiko Kobayashi, Yokohama (JP);
Takeshi Ishizaki, Yokohama (JP);
Kiminori Sugauchi, Yokohama (JP);
Atsushi Ueoka, Yokohama (JP); Toui Miyawaki, Yokohama (JP); Jun Mizuno, Yokohama (JP)

(73) Assignee: Hitachi, Ltd., Tokyo (JP)

(*) Notice: Subject to any disclaimer, the term of this patent is extended or adjusted under 35 U.S.C. 154(b) by 862 days.

(21) Appl. No.: 10/988,590

(22) Filed: Nov. 16, 2004

(65) Prior Publication Data

US 2006/0050630 A1  Mar. 9, 2006

(30) Foreign Application Priority Data

Sep. 9, 2004  (JP)  ............................. 2004-262811

(51) Int. Cl.
*G01R 31/08* (2006.01)
(52) U.S. Cl. ........................................ 370/217; 370/252
(58) Field of Classification Search ................ 370/217, 370/218, 221, 225, 226, 227, 228, 401, 252
See application file for complete search history.

(56) References Cited

U.S. PATENT DOCUMENTS

| | | | |
|---|---|---|---|
| 6,643,254 B1* | 11/2003 | Kajitani et al. | 370/217 |
| 7,075,889 B2* | 7/2006 | Shiozawa | 370/228 |
| 2002/0143999 A1 | 10/2002 | Yamagami | |
| 2004/0024870 A1 | 2/2004 | Hirata | |
| 2004/0103210 A1* | 5/2004 | Fujii et al. | 709/239 |
| 2005/0111350 A1* | 5/2005 | Kano | 370/216 |
| 2005/0152269 A1* | 7/2005 | Liu | 370/225 |

* cited by examiner

*Primary Examiner*—Ricky Ngo
*Assistant Examiner*—Christine Ng
(74) *Attorney, Agent, or Firm*—Antonelli, Terry, Stout & Kraus, LLP.

(57) ABSTRACT

In a system which manages path information and status of network with respect to a path being used for access to a storage apparatus and has a redundant path, when a fault occurs in the network, whether or not the path can be recovered by rerouting in network apparatuses is discriminated, thereby performing proper path switching. Construction information and the path information of the network are managed as information of the path which is being used for a storage access by a management server. Further, when the access path is made redundant, the management server obtains fault information in the network and information showing whether or not the path is being reconstructed from the network apparatuses, thereby discriminating the necessity of the path switching. If the path switching is necessary, the management server notifies a host computer and the storage apparatus of it and each apparatus executes a switching process.

1 Claim, 9 Drawing Sheets

SESSION MANAGEMENT TABLE

| 701 | 702 | 703 | 704 | 705 | 706 | 707 | 708 |
|---|---|---|---|---|---|---|---|
| SESSION ID | INITIATOR | | TARGET | | LU NUMBER | USING PATH ID | STANDBY PATH ID |
| | APPARATUS ID | NODE NAME | APPARATUS ID | NODE NAME | | | |
| 1 | S1 | iqn.2004.com.a:srv1 | T1 | iqn.2004.com.a:str1 | 1 | 1 | 2 |
| 2 | S2 | iqn.2004.com.a:srv2 | T2 | iqn.2004.com.a:str2 | 1 | 3 | 4 |
| 3 | S3 | iqn.2004.com.a:srv2 | T3 | iqn.2004.com.a:str3 | 3 | 5 | 6 |
| | | | | | | | |

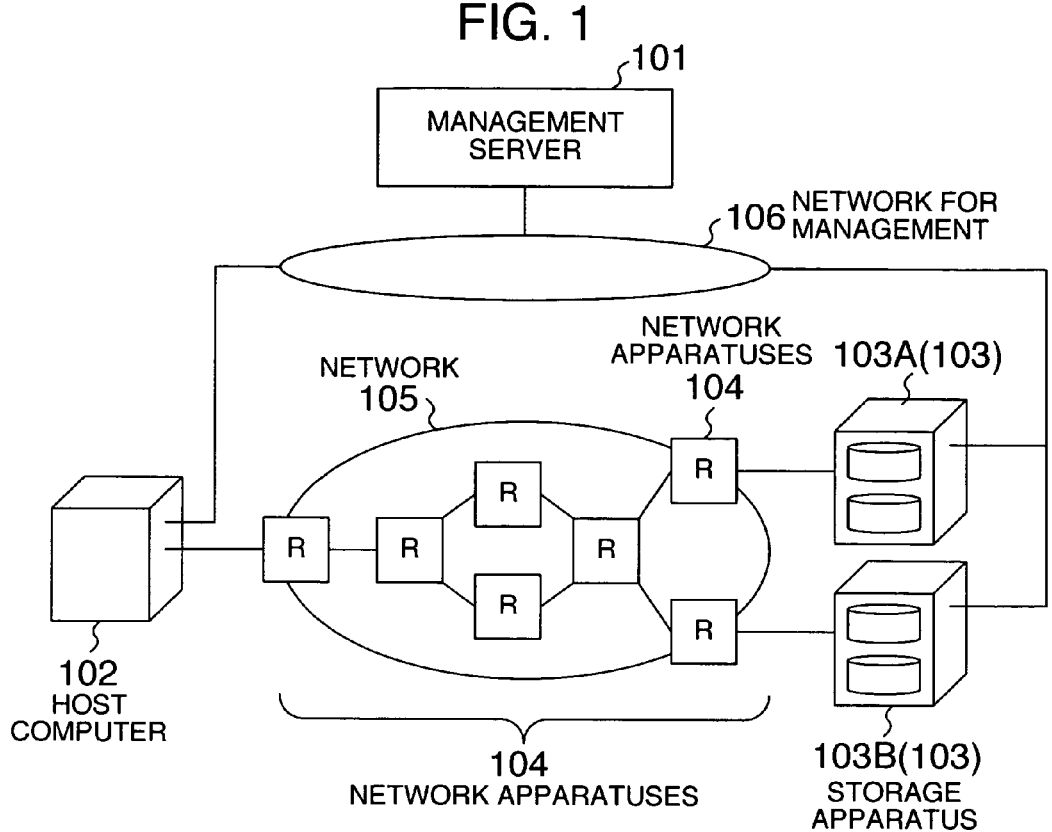
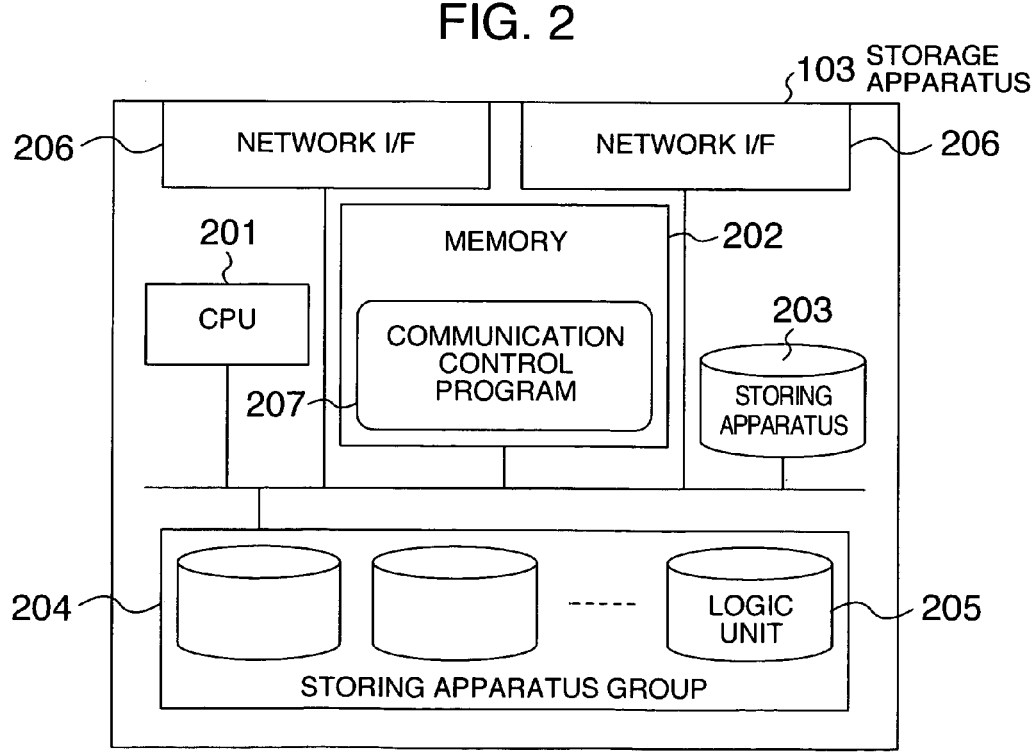

FIG. 6
APPARATUS MANAGEMENT TABLE

| APPARATUS ID (601) | ADDRESS FOR MANAGEMENT (602) | INTERFACE INFORMATION (603, 604, 605) | | |
|---|---|---|---|---|
| | | NUMBER | ADDRESS | PERFORMANCE |
| R1 | 192.168.2.2 | 1 | 192.168.2.2 | 2G |
| | | 2 | 192.168.3.3 | 1G |
| R1 | 192.168.2.2 | 1 | 192.168.2.10 | 1G |
| | | 2 | 192.168.1.20 | 1G |
| | | | | |

FIG. 7
SESSION MANAGEMENT TABLE

| SESSION ID | INITIATOR | | TARGET | | LU NUMBER | USING PATH ID | STANDBY PATH ID |
| --- | --- | --- | --- | --- | --- | --- | --- |
| | APPARATUS ID | NODE NAME | APPARATUS ID | NODE NAME | | | |
| 1 | S1 | iqn.2004.com.a:srv1 | T1 | iqn.2004.com.a:str1 | 1 | 1 | 2 |
| 2 | S2 | iqn.2004.com.a:srv2 | T2 | iqn.2004.com.a:str2 | 1 | 3 | 4 |
| 3 | S3 | iqn.2004.com.a:srv2 | T3 | iqn.2004.com.a:str3 | 3 | 5 | 6 |
| | | | | | | | |

701 702 703 704 705 706 707 708

FIG. 8
PATH MANAGEMENT TABLE

| 801 PATH ID | 802 INITIATOR ADDRESS | 803 TARGET ADDRESS | 804 VIA-APPARATUS ADDRESS | 805 THE NUMBER OF HOPS | 806 BAND | 807 STATUS |
|---|---|---|---|---|---|---|
| 1 | 192.168.2.10 | 192.168.4.10 | 192.168.2.2<br>192.168.3.3<br>192.168.3.2<br>192.168.4.1 | 2 | 1G | UP |
| | | | | | | |

STORAGE NETWORK MANAGEMENT SERVER, STORAGE NETWORK MANAGING METHOD, STORAGE NETWORK MANAGING PROGRAM, AND STORAGE NETWORK MANAGEMENT SYSTEM

INCORPORATION BY REFERENCE

The present application claims priority from Japanese application JP2004-262811 filed on Sep. 9, 2004, the content of which is hereby incorporated by reference into this application.

BACKGROUND OF THE INVENTION

The invention relates to a storage network management server, a storage network managing method, a program for managing a storage network, and a storage network management system.

In conventional storage management, connecting relations between a host computer and storage apparatuses are grasped and paths as connecting paths to the storage apparatuses are managed on the basis of construction information of network apparatuses (for example, a switch and a router).

As a method whereby in a storage network, paths between the host computer and the storage apparatuses are managed on the basis of a port connecting relation among switches and a traffic situation of each path is managed, there is a method shown in US2004/0024870.

A method whereby not only the paths between the host computer and the storage apparatuses are managed but the paths between the storage apparatuses are also automatically selected in accordance with a policy of the user when data in one storage apparatus is remote-copied to another storage apparatus is shown in US2002/0143999.

In recent years, use of an IP (Internet Protocol) network as a storage network has advanced the network to be enlarged in scale and come a long distance. A managing technique of the IP network enables the management of information of the paths between the apparatuses such as routing information, the number of hops, and the like. To improve fault resistance, the network apparatuses are provided with a path control function of automatically switching from a path with a fault to another path, if any, which can avoid the fault.

In the management of the access paths to the storage apparatuses, in the case of an SAN (storage area network) of a small scale by direct connection or a fiber channel switch, the paths can be easily grasped from the connecting relation of the ports.

However, in an IP storage area network (hereinbelow, abbreviated to IP-SAN) using the IP network which can be realized in the large scale and the long distance, the network is complicated and there is such a problem that a load is heavy in the case of managing the path information of the network and the paths for the storage accesses altogether.

In the case where the path is automatically recovered by the path control function of the IP network when a fault occurs on the path between the host computer and the storage apparatus, there is a case where the access is recovered without switching the paths. However, hitherto, there is no means for recognizing such network information.

SUMMARY OF THE INVENTION

It is an object of the invention to realize proper path switching when a fault occurs in a network in a system which manages paths which are used to access storage apparatuses together with path information of the network and which has a redundant path (path for standby).

To accomplish the above object, according to the invention, there is provided a storage network management server for instructing to switch paths when a fault occurs in a network which connects one or more information processing apparatuses and one or more storage apparatuses, comprising: a storing apparatus for storing, every session, a session management table showing identification information of the information processing apparatus and the storage apparatus serving as initiators and the storage apparatus serving as a target in this session, identification information of the path which is being used at present in the session, and identification information of a standby path; an event notification receiving unit for receiving event notifications regarding the faults of each of the apparatuses and network apparatuses connected to each of the apparatuses from the one or more information processing apparatuses and the one or more storage apparatuses; an active path discriminating unit for making discrimination to switch from an active path to the standby path with reference to the session management table in the case where it is determined on the basis of a transmitting source of the received event notification and contents of this event notification that the fault has occurred in one of the network apparatuses in the path which is being used at present by each of the apparatuses; and a path setting instructing unit for transmitting the instruction to switch from the active path to the standby path to each apparatus on the basis of a discrimination result of the active path discriminating unit. Other constructions will be explained in the following embodiment.

According to the invention, in the system which manages the paths to be used for an access to the storage apparatuses together with the path information of the network and has the redundant path (path for standby), the proper path switching can be realized when the fault occurs in the network.

Other objects, features and advantages of the invention will become apparent from the following description of the embodiments of the invention taken in conjunction with the accompanying drawings.

BRIEF DESCRIPTION OF THE DRAWINGS

FIG. 1 is a constructional diagram of a storage network system in an embodiment of the invention;

FIG. 2 is a constructional diagram of a storage apparatus in FIG. 1;

FIG. 6 is a diagram showing an example of a construction of an apparatus management table held in the management server in FIG. 1;

FIG. 7 is a diagram showing an example of a session management table held in the management server in FIG. 1;

FIG. 8 is a diagram showing an example of a path management table held in the management server in FIG. 1;

DESCRIPTION OF THE EMBODIMENT

Figure 3:
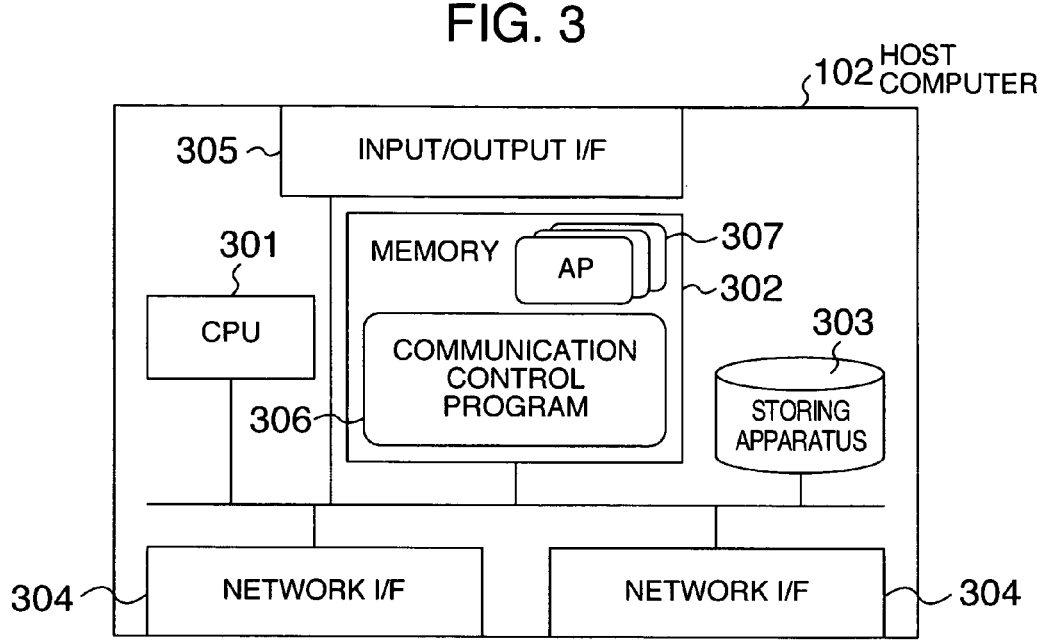
FIG. 3 is a constructional diagram of a host computer in FIG. 1.

A best mode for carrying out the invention (hereinafter, referred to as an embodiment) will be described hereinbelow with reference to the drawings.

FIG. 1 is a system constructional diagram of the embodiment of the invention.

The system of the embodiment is constructed by including: a host computer (information processing apparatus) 102; storage apparatuses 103 (103A, 103B); a network 105 for connecting the host computer 102 and the storage apparatuses 103 (103A, 103B); a storage network management server (management server) 101; and a network 106 for management.

The network 105 is, for example, an IP network and constructed by network apparatuses 104 such as router, switch, and the like.

Although the host computer 102 and the storage apparatuses 103 (103A, 103B) are directly connected to the network 105 in FIG. 1, they can be also connected through a local area network (LAN). Although only one host computer 102 and two storage apparatuses 103 (103A, 103B) are illustrated in FIG. 1 for simplicity of explanation, the number of host computers and the number of storage apparatuses are not limited to such numbers.

Data accompanied with data accesses such as writing and reading of data into/from a disk is transferred among the host computer 102 and the storage apparatuses 103. Data is transferred among the storage apparatuses 103 by using functions such as data copy accompanied with data backup, virtual realization and external connection of the storage apparatuses 103.

Although an IP (Internet Protocol) is used as a communication protocol of the network 105 in the embodiment, the communication protocol is not limited to it. A protocol such as iSCSI (Internet Small Computer System Interface) or the like is used for a storage access on the IP. Further, the management server 101 to manage a path of the storage access is connected to each of the host computer 102 and the storage apparatuses 103 through the network 106 for management.

In the embodiment, the host computer 102 and the storage apparatuses 103 are collectively properly abbreviated as "apparatuses" and the network apparatuses 104 are also properly abbreviated as "apparatuses".

FIG. 2 is a constructional diagram of the storage apparatus in FIG. 1. The storage apparatus 103 is constructed by including: a CPU 201; a memory 202; a storing apparatus group 204 comprising one or more logic units 205; a storing apparatus 203 for storing control information and the like of the logic units 205; and one or more network interfaces (network I/F) 206.

The network I/F 206 is a communication interface for allowing the storage apparatus 103 to communicate with the host computer 102, other storage apparatuses 103, the management server 101, or the like through the network 105 or the network 106 for management.

The CPU 201 loads a storage control program for controlling the logic units 205 and a communication control program 207 for making control of the communication with other apparatuses such as switching or the like of a using port into the memory 202 and executes. It is assumed that those programs have been stored in the storing apparatus 203.

FIG. 3 is a constructional diagram of the host computer in FIG. 1. The host computer 102 is constructed by including: a CPU 301; a memory 302; a storing apparatus 303; one or more network interfaces (network I/F) 304; and an input/output interface (input/output I/F) 305.

The CPU 301 loads an application program (hereinafter, abbreviated to AP) 307 and a communication control program 306 into the memory 302 and executes. The CPU 301 determines the network I/F 304 to be used by the communication control program 306 in accordance with set information transmitted from the management server 101.

The CPU 301 accesses the storage apparatus 103 (refer to FIG. 2) through the communication control program 306 by the AP 307 and inputs/outputs the data into/from the storing apparatus group 204.

The storage apparatus 103 serving as an access destination is called a target and the apparatus serving as an accessing source is called an initiator. Although an explanation will be made on the assumption that the host computer 102 is set to the initiator in the embodiment, the storage apparatus 103 can be also set to the initiator.

A connection relation between the initiator and the target is called a session. The session is identified by an initiator node name (identification information of the apparatus serving as an initiator), a target node name (identification information of the apparatus serving as a target), and the number of the logic unit 205. Further, a connecting path (path) is identified by each apparatus and a network address of each apparatus.

Figure 4:
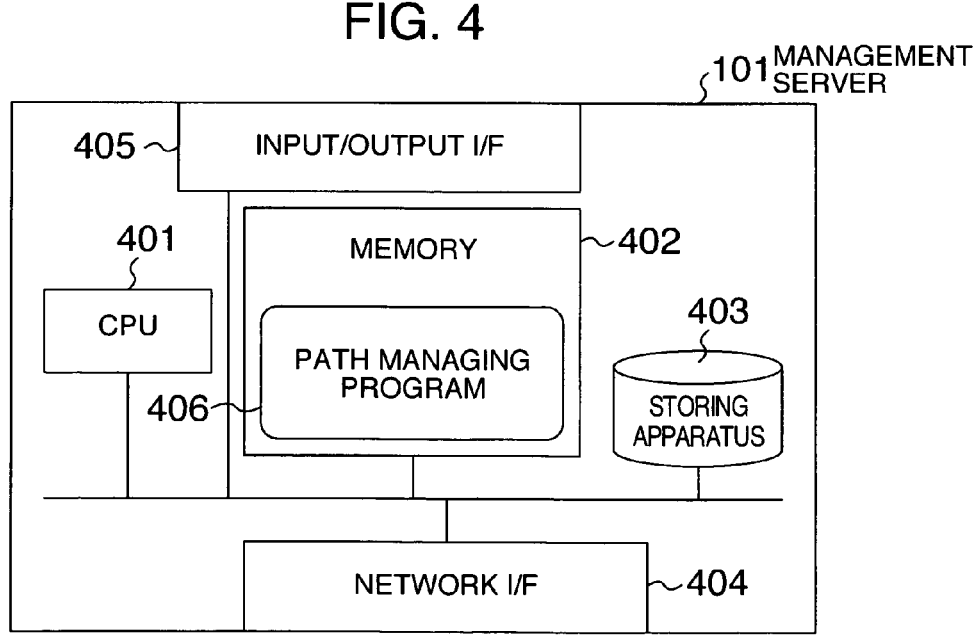
FIG. 4 is a hardware constructional diagram of a management server in FIG. 1.

FIG. 4 is a hardware constructional diagram of the management server in FIG. 1. The management server 101 is constructed by including a CPU 401; a memory 402; a storing apparatus 403; a network interface (network I/F) 404; and an input/output interface (input/output I/F) 405. Although the storing apparatus 403 and the memory 402 are the independent apparatuses in the embodiment, the memory 402 can be also substituted for the storing apparatus 403.

A path managing program (program for managing the storage network) 406 is stored in the storing apparatus 403, loaded into the memory 402, and executed by the CPU 401. An apparatus management table, a session management table, and a path management table are stored in the storing apparatus 403. Details of those tables will be explained hereinafter.

Although the management server 101 is shown as independent hardware in FIG. 1, the path managing program 406 can be also executed together with other programs in an information processing apparatus having hardware constructing elements similar to those in FIG. 4, the storage apparatus 103, or the network apparatus 104. That is, the function (path managing program) of the management server 101 can be also installed as a part of the storage apparatus 103 or the network apparatus 104 (refer to FIG. 1).

Figure 5:
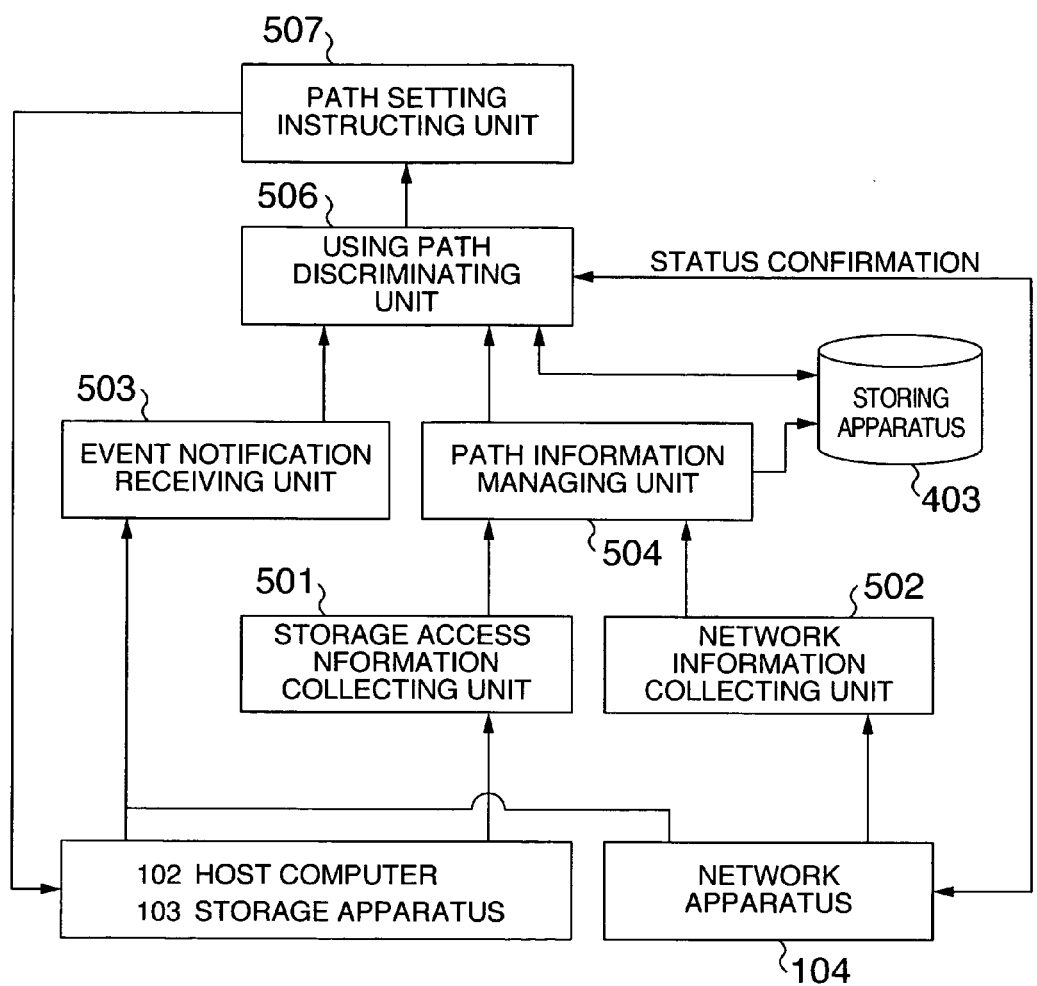
FIG. 5 is a module constructional diagram of a function of the management server in FIG. 1 (module constructional diagram of a path managing program)

FIG. 5 is a module constructional diagram of the function of the management server in FIG. 1 (module constructional diagram of a path managing program).

The management server 101 is constructed by including: a storage access information collecting unit 501 for obtaining access information (a node name and an interface number of the host computer 102, a node name, an interface number, a logic unit number, and the like of the storage apparatus 103) from the host computer 102 (refer to FIG. 1) or the storage apparatus 103 to another storage apparatus 103; a network information collecting unit 502 for obtaining construction information (an interface number of the network apparatus 104, an address set in this interface, and the like) and path information from the network apparatus 104; an event notification receiving unit 503 for receiving an event notification from each apparatus; a path information managing unit 504 for properly updating the apparatus management table, session management table, and path management table in the storing apparatus 403; an active path discriminating unit 506 for discriminating (determining) the path which is being used in each apparatus when the event notification is received or the like; and a path setting instructing unit 507 for notifying the host computer 102 or the storage apparatus 103 of the path determined in the active path discriminating unit 506. Details of the operations of those constructing elements will be described hereinafter.

Those constructing elements are realized by a method whereby the CPU 401 of the management server 101 loads the path managing program into the memory 402 and executes it.

FIG. 6 is a diagram showing an example of a construction of the apparatus management table held in the management server in FIG. 1. In the apparatus management table, with respect to each apparatus which belongs to the network 105 that is managed by the management server 101, the interface information of each apparatus is shown every apparatus ID (identification information) for identifying the apparatus. When the network is constructed or an apparatus is added or deleted, the contents of the apparatus management table are updated by the manual input by the administrator through the input/output I/F 405 or the obtainment of the information from each apparatus via the network 105 (or the network 106 for management).

As shown in FIG. 6, the apparatus management table is constructed by including, for example: an apparatus ID field 601 for identifying the apparatus; a managing address field 602 for managing the address that is used for communication of management information; an interface number field 603 for managing each interface information; an address field 604; and a performance field 605 showing a processing speed of the interface.

In FIG. 6, the managing address of the apparatus of the apparatus ID "R1" is equal to "192.168.2.2". The address of the interface of the interface number "1" is equal to "192.168.2.2". The performance (bandwidth) of this interface is equal to "2 G (bps)".

The session management table will now be described with reference to FIG. 7.

FIG. 7 is a diagram showing an example of the session management table held in the management server in FIG. 1.

As shown in FIG. 7, the session management table shows the connection information to the target (the storage apparatus 103) and the available path information and is constructed by including: a session ID field 701 for storing a session identifier (identification information); an apparatus ID field 702 of the initiator for managing the apparatus ID of the initiator; a node name field 703 of the initiator; a target apparatus ID field 704 for managing the apparatus ID of the target; a node name field 705 of the target; a logic unit (LU) number field 706 of the target; an active path ID field 707 for managing the identifier of the path (path ID); and a standby path ID field 708.

For example, in the session management table in FIG. 7, the session of the session ID "1" shows that the initiator is the apparatus ID "S1" and the node name "ign.2004.com.a:srv1", and targets are the apparatus ID "T1 and the node name "ign.2004.com.a:str1" the LU number "1", and the path of the path ID "1" is in the active mode, and the path of the path ID "2" is in the standby mode.

It is now assumed that the initiator (the host computer 102) allocates the session identifier (session ID) on the basis of the communication control program 306 (refer to FIG. 3) at the time of the connection after the end of the path setting and the management server 101 obtains this identifier and stores it. The management server 101 unconditionally allocates the path identifier (path ID).

Although it is assumed that the path is duplexed in the embodiment, in the case where the path is a simplex, an active path is set into the active path ID field 707 in the session management table and a standby path is not set into the standby path ID field 708. In this case, the path switching process by the management server 101 is not executed. The path can be constructed as a triplex or more and in such a case, a plurality of path information is set into the field of the active path or the standby path.

The management server 101 obtains the connection information of the host computer 102 and the storage apparatus 103 when the network is constructed, the construction of the new host computer 102 or storage apparatus 103 is changed, or the like and registers it into the session management table (refer to FIG. 7). The connection information at this time is obtained by either a method whereby the administrator inputs it by using the input/output I/F 405 of the management server 101 when he sets the permission of the access to the storage apparatus 103 or a method whereby each apparatus transmits the set information of the apparatus to the management server 101. In the case of obtaining the connection information from each apparatus, it is also possible that the management server 101 requests each apparatus to transmit it every predetermined period or the management server 101 is notified upon setting of each apparatus.

The path management table will now be described with reference to FIG. 8.

FIG. 8 is a diagram showing an example of the path management table held in the management server in FIG. 1.

As shown in FIG. 8, the path management table shows the address information of the network apparatuses 104 through which data is passed in the path every path. The path management table is constructed by including: a path ID field 801 for setting a path identifier (path identification information); an initiator address field 802 for registering an address of the initiator; a target address field 803 for registering an address of the target; a via-apparatus address field 804 for registering addresses of the interfaces of the network apparatuses 104 through which the data is passed in the path in the connection between the initiator and the target; a hop number field 805 for registering the number of hops as performance information of the path; a bandwidth field 806 for registering a band; and a path field 807 for setting a status of the path.

For example, in the path management table in FIG. 8, in the path of the path ID "1", the address of the initiator is equal to "192.168.2.10", the address of the target is equal to "192.168.4.10", the addresses of the interfaces of the apparatuses which pass the data via the path in the connection between the initiator and the target are equal to "192.168.2.2", "192.168.3.3", "192.168.3.2", and "192.168.4.1", the number of hops is equal to "2", the band is equal to "1 G (bps)", and the status of the path is "UP (under operation)", respectively.

It is assumed that with respect to the addresses which are used by the target and the initiator in the path (the address in the target address field 803 and the address in the initiator address field 802 in FIG. 8), the storage access information collecting unit 501 obtains the information of each apparatus simultaneously with the creation of the session management table and the path information managing unit 504 registers those addresses on the basis of the obtained information.

It is also assumed that the network information collecting unit 502 obtains the address in the via-apparatus address field 804 from the network apparatus 104 and the path information managing unit 504 registers it.

The storage access information collecting unit 501 and the network information collecting unit 502 of the management server 101 obtain those information from the storage apparatus 103, the host computer 102, and the network apparatus 104 at every predetermined period.

In the case where the bandwidth (information in the bandwidth field 806) differs every hop, the minimum value when seen from the whole path is registered.

With respect to the path status (information in the path field 807), the network information collecting unit 502 obtains the information regarding the statuses (operation statuses) of the network interfaces of the network apparatuses 104 from the network apparatuses 104 through which the data is passed in the path. That is, the storage access information collecting unit 501 periodically obtains connection situations to the network 105 from the initiator and the targets of the relevant path. The path information managing unit 504 discriminates one of the modes of "under operation (UP)", "under stop (DOWN)", and "under route creation (ROUTE)" with respect to each path on the basis of those information and registers the determined mode.

It is assumed that a managing protocol (for example, SNMP: Simple Network Management Protocol) is used for communication between the management server 101 and each apparatus and device. Each of the foregoing information can be transmitted to the management server 101 by executing a managing agent program in each apparatus or device or can be also transmitted by executing a predetermined communication control program.

A path setting process in the case where an apparatus was newly added, where a path is added, or the like will now be described with reference to FIG. 9 (FIGS. 1 to 8 are also properly referred to).

Figure 9:
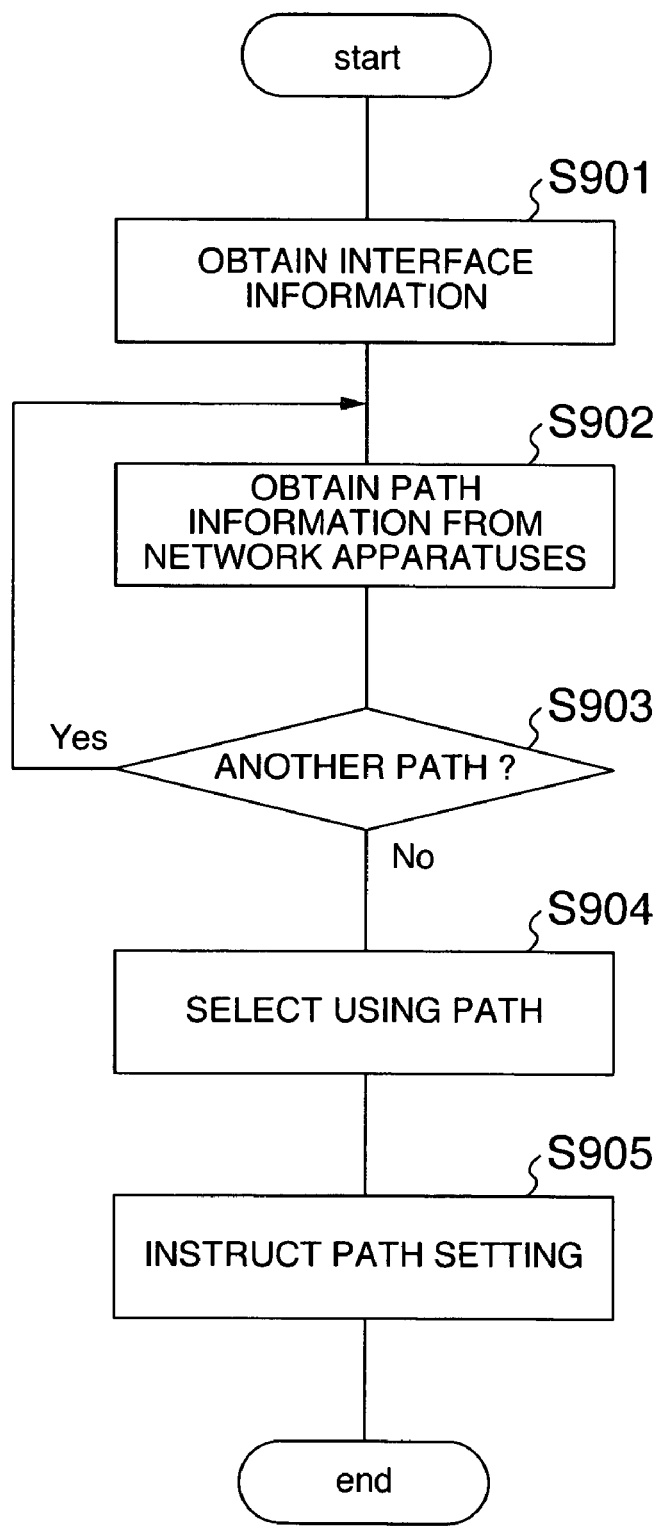
FIG. 9 is a flowchart showing a processing procedure upon path setting of the management server in FIG. 1.

FIG. 9 is a flowchart showing a processing procedure upon path setting of the management server in FIG. 1.

The management server 101 obtains the access information which is used to access the storage apparatus 103 from the host computer 102 (or the storage apparatus 103) (step S901).

The storage access information collecting unit 501 can obtain the access information through the network 106 for management or the network 105, or the administrator can also input it through the input/output I/F 405 of the management server 101.

The access information which is obtained by the storage access information collecting unit 501 is information regarding the node name and the interface number of the initiator and the node name, the interface number, and the logic unit number of the target.

If there is a possibility that the host computer 102 and the storage apparatus 103 use a plurality of interfaces, the storage access information collecting unit 501 also obtains the interface numbers of all initiators of each apparatus while including information showing whether the interface is used or in the standby mode.

In the management server 101, the path information managing unit 504 (FIG. 5) allocates the path identifier (path ID) every path, obtains the addresses of the network interfaces of the initiator and the target with reference to the interface number obtained in step S901 and the apparatus management table (FIG. 6), and registers it into the path management table (FIG. 8).

Subsequently, the network information collecting unit 502 obtains the path information from the network apparatuses 104 through which the data is passed between the interface of the initiator and the interface of the target (S902). The path information which is obtained here is the addresses of the network apparatuses 104 through which the data is passed in the path and the like. When the path information is obtained in step S902, the construction information of the network apparatus 104 (the interface number of the network apparatus 104 and the address, bandwidth, and the like set in this interface) is also obtained.

The path information managing unit 504 registers the obtained information into the session management table (FIG. 7) and the path management table (FIG. 8), respectively. If a plurality of interface information is obtained from the apparatuses, it is determined that another path (standby path) exists (YES in S903) and the processing routine is returned to step S902. The path information using such an interface (and the construction information of each network apparatus 104) is obtained again.

After completion of the obtainment of the path information regarding each path, in other words, if it is determined that there is no another path (NO in S903), the active path discriminating unit 506 selects the path to be used on the basis of the obtained path information and the construction information of each network apparatus 104 (S904). If there is one path, this path is selected. If there are two or more paths, the performance of the paths such as band and the number of hops are compared and the proper one is selected. As a selecting rule in this case, for example, there is such a rule that the band is regarded as a priority discrimination material, the path of the largest band is used, and other paths are set to standby paths.

The path setting instructing unit 507 sets the path selected in step S904 into the initiator and the target through the network 106 for management or the network 105 (S905) and finishes the process once. Upon setting of the path in each apparatus such as initiator (the host computer 102), the target (the storage apparatus 103), or the like, an instruction message is transmitted by the managing agent program (agent program by the SNMP or the like mentioned above) of each apparatus, thereby allowing each apparatus to make the setting, or the management server 101 can also directly instruct each apparatus to execute a path setting command.

The node name of the initiator, the address of the interface to be used in the initiator, the node name of the target, the LU number, and the address of the interface to be used in the target are included in the instruction message which is transmitted at this time.

The path information managing unit 504 registers the set path into the active path ID field 707 (FIG. 8) in the session management table.

The initiator is connected to the target by using the interface designated from the management server 101. Upon connection, the initiator transmits the session identifier (session identification information) that is unconditionally allocated to the management server 101.

Further, a time-out value to wait for a response from the target is set in the initiator. Each apparatus obtains the band and the number of hops of the active path from the management server 101 by the managing agent program, or it is also possible to include the information such as band and the number of hops of the path into the instruction message from the management server 101 side and transmit it.

The managing agent program calculates the time-out value by substituting the band and the number of hops into a predetermined calculating equation.

The initiator sets the time-out value at this time into a response waiting time which is used in the communication control program of the initiator. If the time-out value exceeds the response waiting time, the initiator determines that the communication control program cannot be communicated. If it cannot be communicated, an event notification showing such a fact is transmitted to the management server 101.

In the target (the storage apparatus 103) which received the instruction message, a mode to use the interface designated from the management server 101 is set on the basis of the communication control program. Further, in the case where using interface information of the initiator or its own storage apparatus 103 is designated to the access limitation to the logic unit 205, the path is set on the basis of the instruction message. In this manner, each apparatus and each device sets the path.

The processes of the management server 101 when a fault occurs will now be described with reference to FIG. 10 (FIGS. 1 to 9 are also properly referred to).

Figure 10:
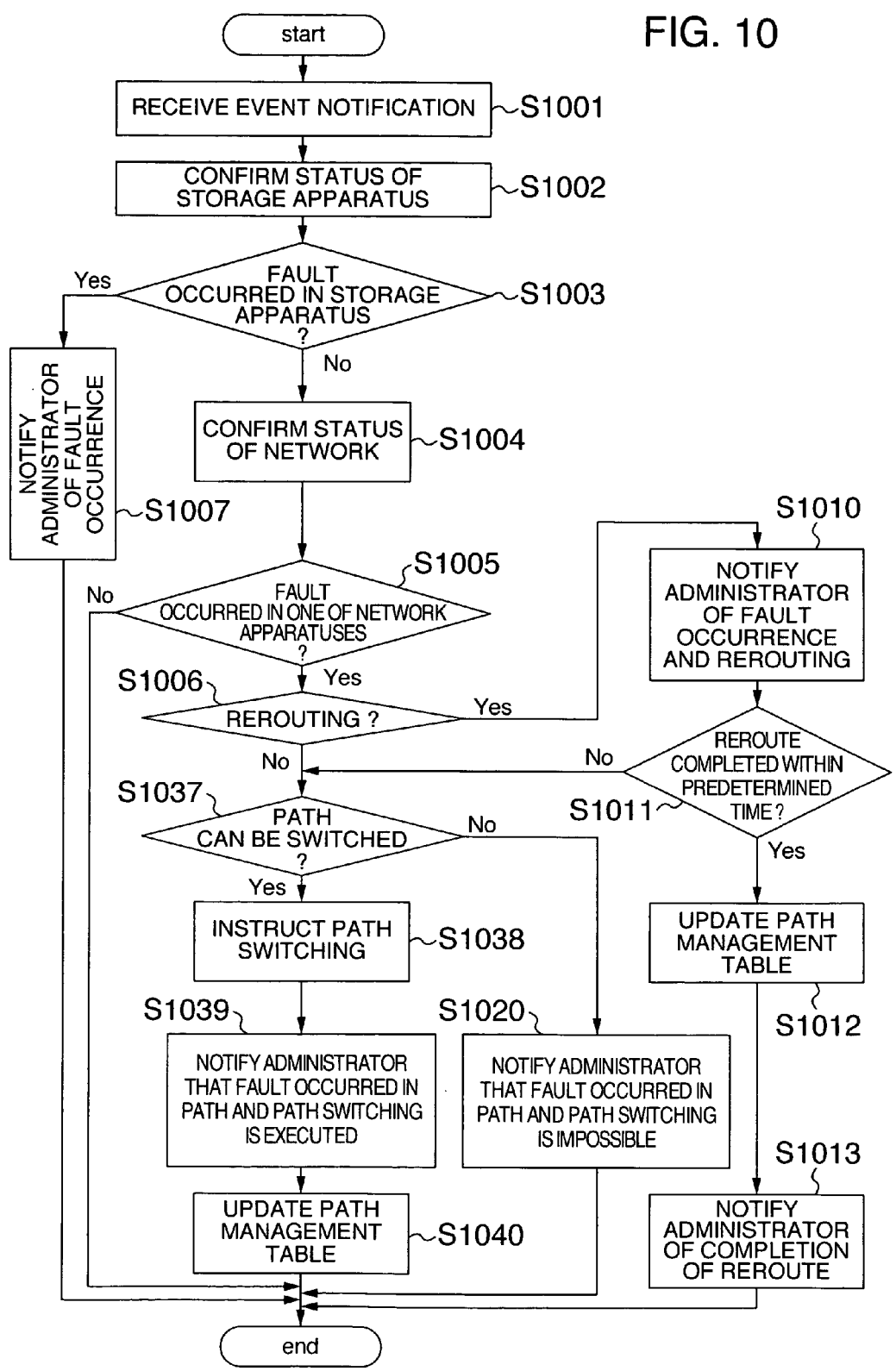
FIG. 10 is a flowchart showing a processing procedure of the management server in FIG. 1 when a fault occurs.

FIG. 10 is a flowchart showing a processing procedure of the management server in FIG. 1 when a fault occurs.

In each apparatus such as host computer 102, storage apparatuses 103, or the like, its own status and the status of the apparatus on the connection destination side are monitored. If it is determined that the status of each apparatus is abnormal (the fault occurred), an event notification showing such a fact is transmitted to the management server 101 (FIG. 1). The management server 101 receives the event notification by the event notification receiving unit 503 (FIG. 5) (S1001).

Subsequently, the active path discriminating unit 506 discriminates whether the fault has occurred in the target (the storage apparatus 103) or the network apparatus 104 on the basis of the transmitting source and the contents of the event in the event notification.

For example, in the case where the event notification receiving unit 503 of the management server 101 receives from the initiator (the host computer 102) such an event showing that the initiator cannot access the target (the storage apparatus 103), that is, the response waiting from the target has timed out in the initiator, the active path discriminating unit 506 of the management server 101 confirms the status of the target (the storage apparatus 103) (S1002). On the basis of a response from the storage apparatus 103, the active path discriminating unit 506 discriminates whether or not the fault has occurred in the storage apparatus 103 (S1003).

At this time, the active path discriminating unit 506 discriminates on the basis of information showing the presence or absence of the event notification from the storage apparatus 103 or the presence or absence of the event notification from another initiator showing that the initiator cannot access the storage apparatus 103.

If the storage apparatus 103 did not normally respond to the status confirmation from the management server 101, it is determined that the fault occurred in the storage apparatus 103 (YES in step S1003) and the administrator is notified that the fault occurred in the storage apparatus (step S1007). For example, a message showing that the fault occurred in the storage apparatus 103 is outputted to a display unit or the like (not shown) of the management server 101 and the processing routine is finished once.

If the active path discriminating unit 506 determined that the storage apparatus 103 normally responded and no fault occurs (NO in S1003), the information of each network apparatus 104 is collected and the status of the network 105 (each network apparatus 104) is confirmed on the basis of the information of the network apparatuses 104 (S1004).

That is, the active path discriminating unit 506 specifies the network apparatuses 104 through which the data is passed in the relevant path with reference to the path management table and the apparatus management table. The active path discriminating unit 506 confirms the status of the specified network apparatus 104.

In the status confirmation at this time, whether or not each network apparatus 104 can reconstruct (reroute) the path is confirmed and, if it can reconstruct the path, whether or not the rerouting process is at present being executed is also confirmed.

On the basis of a response result of the status confirmation, the active path discriminating unit 506 discriminates whether or not each network apparatus 104 is in the normal state, or whether or not the event notification has been sent from each network apparatus 104 is confirmed. That is, whether or not the fault has occurred in one of the network apparatuses 104 on the path that is being used at present is discriminated (S1005).

If the active path discriminating unit 506 determined that no fault occurs in the network apparatuses 104 (NO in S1005), the processing routine is finished as it is.

If the active path discriminating unit 506 determined that the fault has occurred in the network apparatus 104 (YES in S1005), whether or not the network apparatus 104 is rerouting at present is discriminated (S1006).

Figure 11:
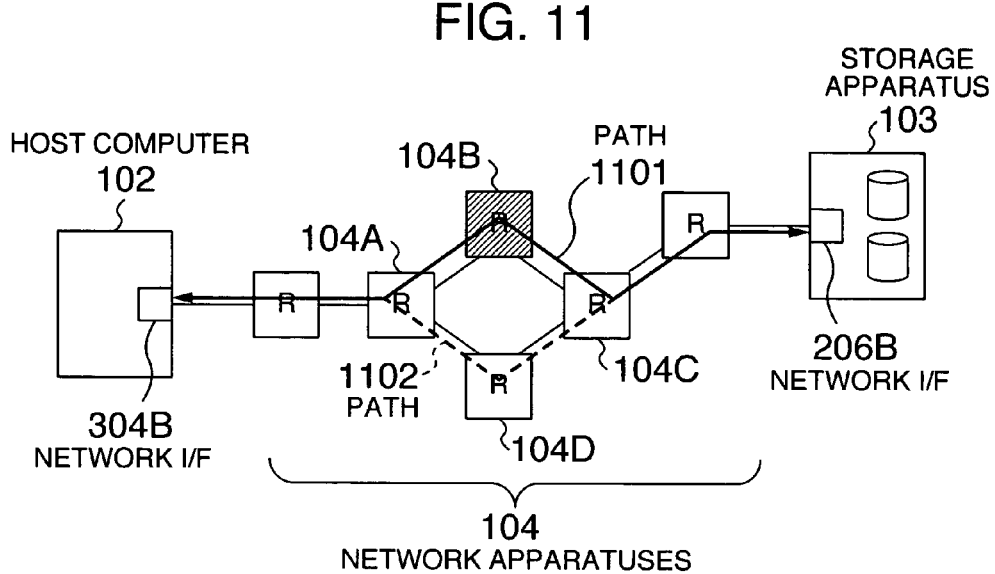
FIG. 11 is a diagram for explaining a mechanism of reconstruction of a path by a network apparatus in FIG. 1.

A mechanism of the reroute (reconstruction of the path) by the network apparatuses 104 will now be described with reference to FIG. 11 (FIGS. 1 to 10 are also properly referred to). FIG. 11 is a diagram for explaining a mechanism of reconstruction of the path by the network apparatuses in FIG. 1.

In the network apparatus 104, the information is exchanged by the network apparatuses 104 constructing the network 105 and if the information can be sent by another path without passing through the network apparatus 104 in which the fault occurred, the path reconstruction (reroute) is executed.

For example, in FIG. 11, it is assumed that the fault occurred in a router 104B in a path 1101 of a router (network apparatus) 104A—the router 104B—a router 104C of the path connecting the network I/F 304 of the host computer 102 and the network I/F 206 of the storage apparatus 103. In this case, the routers 104A and 104C can select a path 1102 via a router 104D.

When the routers 104A and 104C start to reroute, they notify the management server 101 (refer to FIG. 1) that the rerouting process is executed, or if there is a confirmation from the management server 101, the routers 104A and 104C return a response showing the rerouting process is being executed.

Subsequently, when the routers 104A and 104C finish the reroute, they notify the management server 101 of the event indicative of the end of the reroute. If there is a confirmation from the management server 101, the routers 104A and 104C make a response of the end of the reroute.

Returning to the explanation of FIG. 10. When the management server 101 obtains the response showing that the network apparatus 104 is rerouting in step S1004, the active path discriminating unit 506 determines that the network apparatus 104 is rerouting at present (YES in S1006) and the processing routine advances to step S1010.

If the management server 101 did not obtain the response showing that the network apparatus 104 is rerouting in step S1004 mentioned above, the active path discriminating unit 506 determines that the network apparatus 104 is not rerouting (NO in S1006) and step S1037 follows. Processes in step S1037 and subsequent steps will be described hereinafter.

The active path discriminating unit 506 which determined that the network apparatus 104 is rerouting at present outputs a message showing that the fault occurs at present in the network 105 and a message showing that the path is being reconstructed (under rerouting) to the display unit or the like (not shown) of the management server 101 in step S1010. That is, the active path discriminating unit 506 notifies the administrator that the fault of the network 105 occurred and the reroute is being executed. The active path discriminating unit 506 waits for the event notification indicative of the completion of the reroute or a response indicative of the completion of the reroute from the network apparatus 104.

When the management server 101 receives the event notification or response indicative of the completion of the reroute from the network apparatus 104 (YES in S1011), the path information managing unit 504 updates the information of the relevant path in the path management table (S1012). For example, the path information managing unit 504 updates the information of the via-apparatus address field 804, the hop number field 805, the bandwidth field 806, and the like in the path management table in FIG. 8.

The message showing the completion of the path reconstruction (completion of the reroute) in the network 105 is outputted to the display unit or the like (not shown) of the management server 101, thereby notifying the administrator of the completion of the reroute (S1013). The processing routine is finished once.

If the event notification or response indicative of the completion of the reroute cannot be received (NO in S1011) even after the lapse of a predetermined time after the management server 101 received the event notification or response showing that the reroute is being executed from the network apparatus 104 in step S1011, step S1037 follows.

In step S1037, the active path discriminating unit 506 discriminates whether or not the path can be switched with respect to the path in which the fault occurs at present with reference to the session ID included in the event notification received in step S1001 and the session management table. The discrimination here about whether or not the path can be switched is made by a method whereby the active path discriminating unit 506 discriminates whether or not the standby path has been registered in the session management table with respect to the session in which the fault occurs at present.

That is, for example, in the session of the session ID "1" in the session management table shown as an example in FIG. 7, if the fault occurred in the path of the path ID "1", the active path discriminating unit 506 discriminates whether or not the standby path has been registered in the standby path ID field 708 in the session management table. It is also possible to construct in such a manner that if the active path discriminating unit 506 determined that the standby path exists, whether or not this standby path is in the state where the communication is impossible (DOWN) due to the same fault is also discriminated with reference to the status field 807 (refer to FIG. 8) in the path management table.

If the active path discriminating unit 506 determined here that the path can be switched (YES in S1037), the path setting instructing unit 507 transmits a setting instruction to switch the path that is being used at present to the standby path to the host computer 102 and the storage apparatus 103 (S1038). Further, a message showing that the fault occurred in the path and a message showing that the path switching operation is being executed (under automatic recovery) are outputted to the display unit or the like (not shown) of the management server 101. That is, the administrator is notified of the occurrence of the fault in the path and the execution of the path switching operation (S1039). The path information managing unit 504 updates the path management table (information of the active path ID field 707 in FIG. 7) in the session management table (S1040) and the processing routine is finished.

If the active path discriminating unit 506 determined that the path cannot be switched (NO in S1037), the administrator is notified that the fault occurred in the path and the path cannot be switched (S1020). That is, the message showing that the fault occurred in the path and a message showing that the path cannot be switched (automatic recovery is impossible) are outputted to the display unit or the like (not shown) of the management server 101 and the processing routine is finished.

A mechanism for switching the path by the host computer 102 and the storage apparatus 103 upon occurrence of the fault will now be described with reference to FIG. 12. (FIGS. 1 to 11 are also properly referred to)

Figure 12:
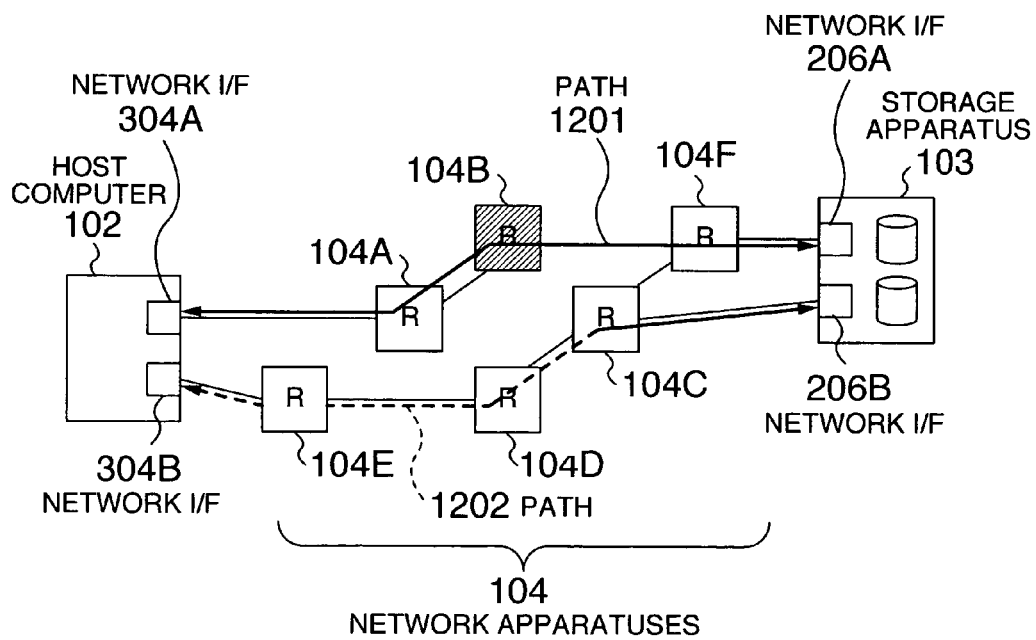
FIG. 12 is a diagram showing an example of the path switching when the fault occurs.

FIG. 12 is a diagram showing an example of the path switching when the fault occurs. As shown in FIG. 12, the initiator (the host computer 102) and the target (the storage apparatus 103) use two network interfaces (network I/F 304A and 304B and network I/F 206A and 206B), respectively, and are connected to the different interfaces of the routers 104, thereby duplexing the path.

In FIG. 12, the path which is connected from the network I/F 304A of the host computer 102 to the network I/F 206A of the storage apparatus 103 through the routers 104A, 104B, and 104F is assumed to be a path 1201. The path which is connected to the network I/F 206B of the storage apparatus 103 through the network I/F 304B of the host computer 102 and the routers 104E, 104D, and 104C is assumed to be a path 1202.

The paths 1201 and 1202 are connected to the storage apparatus 103 through the different routers 104, respectively. It is assumed here that the path 1201 is the active path and the path 1202 is the standby path.

When the fault occurs in the router 104B here, the routers 104A and 104F cannot execute the reroute. Therefore, the management server 101 determines that it is necessary to switch from the path 1201 to the path 1202 and transmits an instruction message to switch the network interfaces to be used to the initiator (the host computer 102) and the target (the storage apparatus 103). The instruction message here includes not only the node names and the addresses of the initiator and the target and the LU numbers but also the session ID.

In the initiator (the host computer 102) and the target (the storage apparatus 103), the network interfaces to be used are changed in response to the switching instruction from the management server 101.

For example, the initiator (the host computer 102) changes the network I/F 304A to the network I/F 304B. The target (the storage apparatus 103) changes the network I/F 206A to the network I/F 206B.

The initiator (the host computer 102) is connected to the target (the storage apparatus 103) by the same session ID by the predetermined communication control program by using the network interface designated from the management server 101.

If the standby path is not registered in the same session ID with reference to the session management table or if it is determined that the communication is impossible (DOWN) also in the standby path due to the same fault with reference to the status field 807 (refer to FIG. 8) in the path management table, the management server 101 does not execute the path switching process but outputs the message showing that the fault occurred in the path and the message showing that the path cannot be switched (the automatic recovery is impossible) to the display unit or the like (not shown) of the management server 101.

Processes in the case where the path in which the fault occurred is recovered will be further described. Upon detection of the path recovery, the management server 101 transmits a status confirmation request to the network apparatus 104 existing in the fault position at every predetermined period and, when the response from the network apparatus 104 is normal and the information of each interface is normal, it is determined that the fault path has been recovered, or the administrator can also manually input information indicative of the path recovery to the management server 101 when the fault of the network 105 is recovered.

The management server 101 again collects the path information of the recovered path through the network information collecting unit 502 and the path management table is updated by the path information managing unit 504. Further, the active path discriminating unit 506 compares the performance such as band and the number of hops of the recovered path with that of the active path. In the case where the performance of the recovered path is better than that of the active path (for example, when the band is larger or the number of hops is smaller), the path setting instructing unit 507 again transmits the path switching instruction. In the host computer 102 and the storage apparatus 103, the instruction is received and the active path is switched and returned to the active path before the occurrence of the fault. In the case of switching the path, the message showing that the path switching is executed is outputted to the display unit (not shown) of the management server 101.

By the above operation, in the access from the host computer 102 to the storage apparatus 103, the host computer 102 can use the optimum path. Even at the time of the occurrence of the path fault, the management server 101 grasps the situation of the network 105 and can execute the switching process of the proper path from the host computer 102 to the storage apparatus 103.

The management server 101 according to the embodiment can be realized by the path managing program for executing the processes as mentioned above and such a program can be stored in a computer-readable storing medium (CD-ROM or the like) and provided. The program can be also provided through the network.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage network management server for instructing to switch paths when a fault occurs in one of a plurality of network apparatuses of a network which connects at least one information processing apparatus and at least one storage apparatus, wherein the storage network management server comprises:

a storing apparatus for storing, every session, a session management table showing identification information of the information processing apparatus and a first storage apparatus serving as initiators and a second storage apparatus serving as a target in said session, identification information of an active path which is being used at present in said session between said information processing apparatus, said first storage apparatus and said second storage apparatus, and identification information of a standby path, an event notification receiving unit for receiving event notifications regarding a fault of one of the network apparatuses in the active path, an active path discriminating unit for making discrimination to switch said active path to said standby path with reference to said session management table in a case where it is determined on the basis of a transmitting source of said received event notification and contents of said event notification that the fault has occurred in said one of said network apparatuses in the active path, and a path setting instructing unit for transmitting the instruction to switch from the active path to said standby path on the basis of a discrimination result of said active path discriminating unit, wherein said server further includes:

means for receiving the event notifications regarding the fault;

on the basis of the transmitting source of said received event notification and the contents of said event notification, means for discriminating whether the fault has occurred in said one of said network apparatuses in the active path which is being used at present by said information processing apparatus, said first storage apparatus and said second storage apparatus, if it is determined in said discriminating unit that the fault has occurred in said one of said network apparatuses, means for determining whether or not said one of said network apparatuses is rerouting, and, if so, whether the rerouting has been completed within a predetermined time, if it is determined that said one of said network apparatuses is not rerouting or has not completed rerouting within said predetermined time, means for discriminating whether or not the standby path exists in said session with reference to said session management table; and if it is determined in said discriminating unit that said standby path exists, means for transmitting an instruction for allowing a switch from the active path to said standby path, wherein said storing apparatus further comprises means for storing a path management table showing address information of the network apparatuses through which data is passed in said active path every identification information of said active path, in the means for discriminating whether the fault has occurred in one of said network apparatuses on the basis of the transmitting source of said received event notification and the contents of said event notification, if it is determined that the fault has occurred in one of said network apparatuses, the server further including means for specifying the network apparatuses through which data is passed in said active path in which the fault has occurred with reference to said path management table and collecting information of each of said network apparatuses;

means for discriminating whether or not one of said network apparatuses is reconstructing a path on the basis of said collected information of each of said network apparatuses;

means for discriminating whether or not the standby path exists in said session with reference to said session management table when one of said network apparatuses is reconstructing the path in the step of discriminating whether or not one of said network apparatuses is reconstructing the path and a notification indicative of completion of the reconstruction of the path is not received from said network apparatus under the path reconstruction within a predetermined period of time; and means for transmitting an instruction to switch from the active path to said standby path to each of said information processing apparatus, said first storage apparatus and said second storage apparatus if it is determined that said standby path exists in the step of discriminating whether or not the standby path exists in said session.

* * * * *